United States Patent [19]

Schliebs et al.

[11] 3,726,973
[45] Apr. 10, 1973

[54] 1-ALKOXY(-ALKENYLOXY,-PHENOXY)-1-THIONO-3-CHLORO(3-ALKYL) PHOSPHOLINES COMPOSITIONS AND THEIR USE

[75] Inventors: Reinhard Schliebs, Koeln-Flittard; Hanshelmut Schlor, Wuppertal; Bernhard Homeyer, Opladen, all of Germany

[73] Assignee: Farbenfabriken Bayer Aktiengesellschaft, Leverkusen, Germany

[22] Filed: Aug. 20, 1971

[21] Appl. No.: 173,677

Related U.S. Application Data

[62] Division of Ser. No. 830,122, June 3, 1969, Pat. No. 3,644,598.

[30] Foreign Application Priority Data

June 14, 1968  Germany.....................P 17 68 662.3

[52] U.S. Cl.................................................424/209

[51] Int. Cl...............................................A01n 9/36
[58] Field of Search......................424/209; 260/936

[56] References Cited

UNITED STATES PATENTS

| 2,761,806 | 9/1956 | Boyer | 260/964 |
| 3,285,999 | 11/1966 | Buchner | 424/209 |

*Primary Examiner*—Albert T. Meyers
*Assistant Examiner*—Norman A. Drezin
*Attorney*—Ralph D. Dinklage et al.

[57] ABSTRACT

Compositions comprising 1-alkoxy(-alkenyloxy,-phenoxy)-1-thiono-3-chloro(3-alkyl) phospholines, i.e., 1-(alkoxy, alkenyloxy, chloroalkoxy, alkylphenoxy, alkylmercaptophenoxy and chloro-substituted phenoxy)-3-(chloro and alkyl)-$\Delta^3$ and $\Delta^2$-phospholines, and their use in combating nematodes, arthropods, especially acarids and insects, and fungi.

12 Claims, No Drawings

1-ALKOXY(-ALKENYLOXY,-PHENOXY)-1-THIONO-3-CHLORO(3-ALKYL) PHOSPHOLINES COMPOSITIONS AND THEIR USE

This application is a division of U.S. application Ser. No. 830,122, filed June 3, 1969, now U.S. Pat. No. 3,644,598.

The present invention relates to and has for its objects the provision of compositions of new 1-alkoxy (-alkenyloxy, -phenoxy)-1-thiono-3-chloro(3-alkyl)phospholines, i.e., 1-(alkoxy, alkenyloxy, chloroalkoxy, alkylphenoxy, alkylmercapto-phenoxy and chloro-substituted phenoxy)-3-(chloro and alkyl)-Δ³ and Δ²-phospholines, which possess nematocidal, arthropodicidal, especially insecticidal and acaricidal, and fungicidal properties, mixtures of such compounds with solid and liquid dispersible carrier vehicles, and methods for producing such compounds and for using such compounds in a new way especially for combating pests, e.g. nematodes, arthropods, and fungi, with other and further objects becoming apparent from a study of the within specification and accompanying examples.

Phosphoric or thiophosphoric acid esters with nematocidal activity have been known from the literature for some time. Thus, for example, in U.S. Pat. No. 2,761,806, O,O-diethyl-O-(2,4-dichloro-phenyl)-thionophosphoric acid ester (A) is described as having a good effectiveness in this respect. Furthermore, O,O-diethyl-O-(4-methylmercapto-phenyl)-thionophosphorric acid ester (B) and O,O-diethyl-O-pyrazin-2-yl-thionophosphoric acid ester (C) known from German Auslegeschriften 1,101,406 and 1,156,274 are known to be distinguished by nematocidal effectiveness.

On the other hand, most pesticidally effective phosphoric or thiophosphoric acid esters possess, as is known, a not inconsiderable toxicity towards warm-blooded animals. Thus, for example the median lethal dose of the above-mentioned O,O-diethyl-O-(2,4-dichloro-phenyl)-thionophosphoric acid ester (A) in the rat per os is 270 mg/kg animal [see G. Schrader "Die Entwicklung neuer insektizider Phosphorsaureester," Verlag Chemie, Weinheim/Bergstrasse, 3rd edition (1963), page 210].

It has now been found, in accordance with the present invention, that the particular new 1-alkoxy(-alkenyloxy,-phenoxy)-1-thiono-3-chloro(3-alkyl)-Δ³ and Δ²-phospholines of the formula

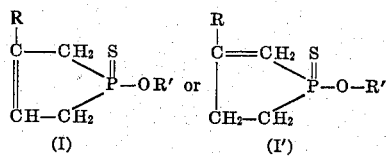

in which
R is chloro or alkyl of one to four carbon atoms,
R' is alkyl of one to six carbon atoms, alkenyl of two to four carbon atoms, chloroalkyl of one to four carbon atoms, alkylphenyl having one to four carbon atoms in the alkyl moiety, alkylmercaptophenyl having one to four carbon atoms in the alkylmercapto moiety, or chloro-substituted phenyl,
exhibit strong nematocidal, arthropodicidal, espcially insecticidal and acaricidal, and fungicidal properties.

It has been furthermore found, in accordance with the present invention, that the compounds of formula (I) above may be provided by the process which comprises reacting the corresponding 1-thiono-1,3-dihalogen- or 1-thiono-1-halogen-3-alkyl-phospholine of the formula

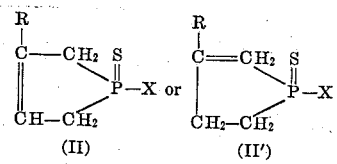

in which R is the same as defined above and X is a halogen atom such as chloro, bromo, fluoro or iodo, especially chloro,
with an alcohol or phenol of the formula

in which R' is the same as defined above, preferably in the presence of an acid-binding agent.

Surprisingly, the active compounds according to the present invention, compared to analogous active compounds of the same type of activity hitherto known form the literature, are distinguished by a substantially better effectiveness, in particular outstanding nematocidal properties and, in addition, noteworthy insecticidal, acaricidal and soil-fungicidal activity, with considerably lower toxicity to warm-blooded animals. Therefore, the instant compounds represent a valuable contribution to the art.

The course of the production reaction can be represented by the following formula scheme

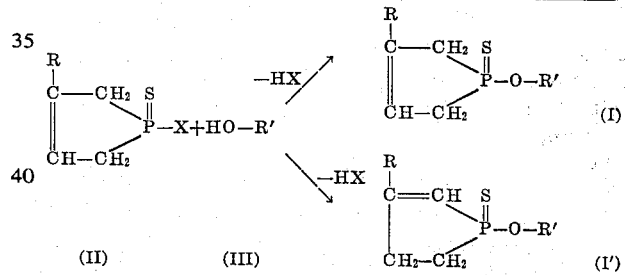

in which R, R' and X are the same as defined above.

Advantageously, in accordance with the present invention, in the various formulae herein:
R represents
 chloro; or
 straight and branched chain lower alkyl hydrocarbon of one to four carbon atoms such as methyl ethyl, n- and iso-propyl, n-, iso-, sec.- and tert.-butyl, and the like, especially $C_{1-3}$ or $C_{1-2}$ alkyl, and more especially methyl; and
R' represents
 straight and branched chain alkyl hydrocarbon of one to six carbon atoms such as methyl to tert.-butyl inclusive as defined above, amyl, isoamyl, n-hexyl, isohexyl, pinacolyl (i.e., [CH₃]₃C—[CH₃]CH—), and the like, especially $C_{1-4}$ or $C_{1-3}$ or $C_{1-2}$ alkyl, and more especially methyl; or
 straight and branched chain alkenyl hydrocarbon of two to four carbon atoms such as vinyl, α-, β- and γ-allyl, but-1,2 and 3-enyl, and the like, especially $C_{3-4}$ alkenyl, more especially $C_3$ alkenyl, and preferably α-allyl; or
 chloro-alkyl having one to four carbon atoms such as chloromethyl to tert.-butyl inclusive as defined above, and the like, especially chloro-$C_{1-3}$ or $C_{1-2}$ alkyl, and more especially 2chloro-ethyl; or alkylphenyl having one to four carbon atoms in the alkyl moiety such as 2-, 3- and 4-methyl to tert.-butyl inclusive as defined above, and the like, - phenyl, especially 4- $C_{1-4}$ alkylphenyl; or alkylmercaptophenyl having one to four carbon atoms in the alkylmercapto to moiety such as 2-, 3- and 4- methyl to tert.-butyl inclusive as defined above, -mercapto-phenyl, and the like, especially 2-, 3- and 4- $C_{1-3}$ or $C_{1-2}$ alkylmercaptophenyl, preferably methylmercaptophenyl, and particularly 4-methylmercaptophenyl; or chloro-substituted phenyl such as 2-, 3- and 4-mono, 2,3-, 2,4-, 2,5-, 2,6-, 3,4- and 3,5- di, and 2,3,4-, 3,4,5-, 2,3,6-, 2,4,5- and 2,4,6- tri, and the like, especially tri, -chloro-substituted phenyl, and more especially 2,4,5-tri-chlorophenyl, i.e. mono to tri-chlorophenyl.

In particular, R is chloro; or $C_{1-4}$ or $C_{1-2}$ alkyl; R' is $C_{1-4}$ alkyl; or $C_{1-4}$ alkylphenyl; or $C_{1-4}$ alkylmercaptophenyl.

It will be realized that the compounds of the present invention contemplate both the $\Delta^3$ and $\Delta^2$ isomers, i.e., in which the nuclear double bond is in the 3,4-position and 2,3-position, respectively.

Examples of alcohols suitable for the production process are: methyl, ethyl, propyl, isopropyl, n-butyl, isobutyl, sec.-butyl, n-amyl, isoamyl, tert.-amyl, 1,2,2-trimethyl propyl, pinacolyl, allyl, 2-chloroethyl, and 2,2,2-trichloro-ethyl alcohol; and the like.

Phenols suitable for the instant reaction are for example: 2-, 3- and 4-chloro-, 2,4- and 2,5-dichloro-, 2,4,5- and 2,4,6-trichloro-, 2-, 3- and -4-methyl-, 2-, 3- and 4-ethyl-, 4-tert.-butyl-, 3-tert.-butyl-; 2-, 3- and 4-methyl-; -mercapto-phenol; and the like.

Examples of 1-thiono-1,3-halogen- or -1-halogen-3-alkyl-phospholines according to formula (II) above to be reacted according to the present invention are: 1-thiono-1,3-dichloro-, 1-thiono-1-bromo-3-chloro-, 1-thiono-1-chloro-3-methyl- or 1-thiono-1-chloro-3-ethyl-$\Delta^3$ and $\Delta^2$-phospholines; and the like.

Some of the 1-thiono-1,3-halogen- or -1-halogen-3-alkyl-phospholines of formula (II) above required as starting materials are described in the literature and can be prepared, even on an industrial scale, according to various known methods.

Either the appropriate oxo compounds are reacted according to the method of M.J. KABACHNIK (Dokl.Akad.Nauk.SSSR, [Reports of the Academy of Sciences of the USSR] 110 (1956), page 217) according to the following equation with phosphorus pentasulfide

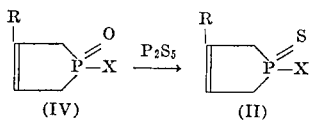

(IV)    (II)

or 1,1,1-trihalogenphospholines as described in German Patent (DAS)1,199,264 are caused to react with hydrogen sulfide:

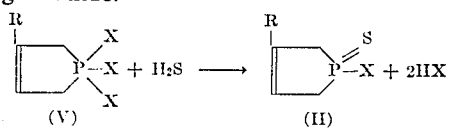

(V)    (II)

0030 in which R and X are, in each case, the same as defined above.

The oxo-phospholines required for the first-mentioned process are readily accessible according to the particulars given by G.M. BOGOLYUBOV et.al (Z.obs. chim. Journal of General Chemistry [USSR], Vol 33 [1963], pages 783 and 2419) and in German Patent (DAS)1,199,264.

As can be seen from the above formulae (I) and (I'), in the esterification reaction there may occur a migration of the double bond of the thionophospholine ring from the 3,4-position (i.e.,$\Delta^3$) into the 2,3-position (i.e.,$\Delta^2$) and vice versa. Mixtures of two isomers are therefore obtained in the reaction. Such shifts of double bonds in phospholines are known from the literature (see for example "H.WEITKAMP and A.KORTE, Z. analyt. Chem. Vol. 204, (1964), pages 245 to 263" and "K. HASSERODT et.al. Tetrahedron, Vol. 19, (1963), page 1563." According to WEITKAMP and KORTE (loc.cit.), the exact position of the double bond can be ascertained by nuclear resonance and ultraviolet spectroscopy. Moreover, it is readily possible to separate the two isomers by suitable separation methods (for example separating columns, preparative gas chromatography or fractional distillation over particularly efficient columns). The course of such a separation and the purity of the products obtained can be followed, or determined, by thin-layer chromatography. Even in the case of the above-mentioned preparation of the starting products by sulfurization of the appropriate oxo compounds, a shift of the double bond in the manner stated can also occur.

Since, however, both isomers (i.e.,$\Delta^3$ and $\Delta^2$) are practically equal effective pesticidally, as has been found in accordance with the present invention, separation of the mixture is not necessary for their use as pesticides. The strongly biocidal, in particular nematocidal, effectiveness of the particular new compounds of formulae (I) and (I') according to the present invention could not in any way be foreseen since the instant compounds prove almost non-toxic to warm-blooded animals and also neither an insecticidal activity nor any particular biological effect was known for compounds of analogous constitution. The new compounds according to the present invention therefore represent a genuine enrichment of the art, as aforesaid.

The production reaction according to the present invention is preferably carried out in the presence of a solvent (the term solvent including mere diluents). As such, an excess of the reactant alcohol may be used if it is liquid under the conditions of the reaction. Otherwise, or in addition, inert organic solvents are suitable, such as ketones (for example acetone, methylethyl, methylisopropyl or methylisobutyl ketone); ehters (for example diethyl ether, di-n-butyl ether, dioxan or tetrahydrofuran); as well as (possibly chlorinated) aliphatic or aromatic hydrocarbons (for example methylene chloride, di-, tri- and tetra-chloroethane, chloroform, carbon tetrachloride, benzene, chlorobenzene, toluene or xylene); and the like.

As already mentioned above, preparation of the new compounds according to the present invention is preferably carried out in the presence of an acid-binding agent. Suitable for this purpose are, in particular, alkali metal alcoholates, hydroxides and carbonates, such as potassium or sodium methylate, ethylate, hydroxide or carbonate; also, aliphatic, aromatic and heterocylic bases, for example triethylamine, diethylaniline, benzyldimethylamine and pyridine; and the like.

The esterification reaction temperature can be varied within a fairly wide range. In general, the reaction is carried out at substantially between about −20° to 80° C, preferably at between about 10° to 50° C.

To prepare the instant new compounds, 2 to 10 mols of the alcohol to be esterified are preferably used per mol of 1-thiono-1,3-dihalogen- or -1-halogen-3-alkyl phospholine. In the case of reactions using phenols, however, stoichiometric amounts or a slight excess only of the latter (about 10 percent) is normally used. Finally, the acid-binding agent is usually used in an equimolar amount.

The working up of the reaction mixture takes place in known manner by adding water thereto, extraction of the crude product with the aid of a suitable solvent (for example ether or chlorinated hydrocarbon), drying the organic phase, drawing off the solvent under reduced pressure and, possibly, distillation or recrystallization of the residue. When the products are obtained in the form of viscous, non-crystallizing or non-distillable oils, they can, by so-called "slight distillation," that is by brief heating in a vacuum to slightly to moderately elevated temperatures, be freed from the last solvent residues and other volatile components and in this way be purfied.

As noted above, the active compounds according to the present invention are distinguished by an outstanding, rapidly-commencing nematocidal effectiveness, with only slight toxicity to warm-blooded animals and only slight phytotoxicity, and possess, in addition, a markedly good insecticidal, acaricidal and soil-fungicidal effect.

By reason of these properties, the instant active compounds may be used advantageously in plant protection for the control of nematodes, especially those of phytopathogenic nature. In view of the simulatneous insecticidal, acaricidal and soil-fungicidal activity of the instant compounds, any sucking or eating insects, Diptera or mites, or soil-inhabiting phytopathogenic fungi, which may be present are destroyed at the same time. As a result of this broad spectrum of activity of the instant compounds, the necessity for separate control of the various types of pests (which often occur together) does not arise, a fact which represents a further considerable technological advance.

To the phytopathogenic nematodes contemplated herein there belong, in the main, leaf nematodes (Aphelenchoides), such as chrysanthemum foliar nematodes (*A. ritzenmabosi*), strawberry nematodes (*A. fragariae*) and rice nematodes (*A. oryzae*); stem nemodes (*Ditylenchus*), for example the stem nematode (*D. dipsaci*); root gall nematodes (*Meloidogyne*), such as *M. arenaria* and *M. incognita*; cyst-forming nematodes (Heterodera), such as golden nematode of potato (*H. rostochiensis*), and sugar beet nematode (*H. schachtii*); and free-living root nematodes, for example those of the genera Pratylenchus, Pratylenchus, Rotylenchus, Xiphinema and Radopholus; and the like.

To the sucking insects contemplated herein there belong, in the main, aphids, such as the green peach aphid (*Myzus persicae*), the bean aphid (*Doralis fabae*); scales, such as *Aspidiotus hederae*, *Lecanium hespedridum*, *Pseudococcus maritimus*, Thysanoptera, such as *Hercinothrips femoralis*; and bugs, such as the beet bug (*Piesma quadrata*) and the bed bug (*Cimex lectularius*); and the like.

With the biting insects contemplated herein there are classed, in the main, butterfly caterpillars, such as the *Plutella maculipennis* and *Lymantria dispar*; beetles, such as granary weevils (*Sitophilus granarious*), the Colorado beetle (*Leptinotarsa decemlineata*), and also species living in the soil, such as wireworms (*Agriotes* sp.) and larvae of the cockchafer (*Melolontha melolontha*); cockroaches, such as the German cockroach (*Blatella germanica*); Orthoptera, such as the house cricket (*Gryllus domesticus*); termites, such as Reticulitermes; and Hymenoptera, such as ants; and the like.

The Diptera contemplated herein comprise in particular the flies, such as the vinegar fly (*Drosophila melanogaster*), the Mediterranean fruit fly (*Ceratitis capitata*), the house fly (*Musca domestica*), and gnats, such as the mosquitoes: *Aedes aegypti*, *Culex pipiens* and *Anopheles stephensi*; and blow flies such as *Lucilia sericata* and *Chrysomya chloropyga*; and the like.

In the case of the mites contemplated herein, particularly important are the spider mites (Tetranychidae) such as the two-spotted spider mite (*Tetranychus urticae*), the European red mite (*Paratetranychus pilosus*); gall mites, such as the currant gall mite (*Eriophyes ribis*) and tarsonemids, such as *Tarsonemus pallidus*; and ticks, such as the relapsing fever tick (*Ornithodorus moubata*) and *Boophilus microplus*; and the like.

The active compounds according to the instant invention can be utilized, if desired, in the form of the usual formulations or compositions with conventional inert (i.e., plant compatible or herbicidally inert) pesticidal diluents or extenders, i.e., conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with convential pesticidal dispersible liquid diluent carriers and/or dispersible solid carriers optionally with the use of carrier vehicle assistants, e.g., conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.) and/or water; as well as inert dispersible finely divided solid carriers, such as ground natural minerals (e.g., kaolins, alumina, silica, chalk, i.e. calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethlene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other nematocides, acaricides, insecticides, fungicides, and the like, or herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.00001–20 percent, preferably 0.01–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.00001–95 percent, and preferably 0.01–95 percent, by weight of the mixture.

The active compunds can also be used in accordance with the well known ultra-low-volume process with good success, i.e., by applying such compound if normally a liquid, or by applying a liquid composition containing the same, via very effective atomizing equipment in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g., about 20–100 percent by weight of the active compound.

In particular, the present invention contemplates methods of selectively killing, combating or controlling pests, e.g. nematodes, arthropods, i.e., insects and acarids, and fungi, especially soil-fungi, and more particularly, methods of combating at least one of nematodes, insects, acarids, and fungi, which comprise applying to at least one of correspondingly (a) such nematodes, (b) such insects, (c) such acarids, (d) such fungi, and (e) the corresponding habitat thereof, i.e., the locus to be protected, a correspondingly combative or toxic amount, i.e., a nematocidally, arthropodicidally, especially insecticidally or acaricidally, and/or fungicidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be appreciated by the artisan that when using the instant active compounds against nematodes, such active compounds are preferably uniformly scattered in applied amounts of 5–50 kg of active compound per hectare and then worked into the soil.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated, without limitation, by the following examples:

EXAMPLE 1

Critical concentration test
  Test nematode: *Meloidogyne incognita*
  Solvent: 3 parts by weight acetone
  Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is diluted with water to the desired final concentration.

The preparation of the given active compound is intimately mixed with soil which is heavily infested with the test nematodes. The concentration of the active compound in the preparation is of practically no importance; only the amount of active compound per unit voluume of soil, which is given in p.p.m., is decisive. The soil is filled into pots, leettuce is sown in and the pots are kept at a greenhouse temperature of 27° C. After 4 weeks, the lettuce roots are examined for infestation with nematodes, and the degree of effectiveness of the given active compound is determined as a percentage. The degree of effectiveness is 100 percent when infestation is completely avoided; it is 0 percent when the infestation is exactly the same as in the case of the control plants in untreated soil which has been infested in the same manner.

The particular active compounds tested, the amounts applied and the results obtained can be seen from the following Table 1:

TABLE 1.—CRITICAL CONCENTRATION TEST

| Active compound | Degree of effectiveness as a percentage in the case of applied amounts of p.p.m. | | | | |
|---|---|---|---|---|---|
| | 40 | 20 | 10 | 5 | 2.5 |
| (A) $(C_2H_5-O)_2P(=S)-O-C_6H_3Cl_2$ (2,5-dichlorophenyl) — Comparative preparation known from U.S. Patent 2,761,806 | 98 | 80 | 50 | 0 | 0 |
| ($1_1$) Cyclopropylidenemethyl-CH$_2$-P(=S)(OCH$_3$)$_2$ with CH$_3$ substituent | 100 | 98 | 95 | 50 | 0 |
| ($2_1$) Cyclopropylidenemethyl-CH$_2$-P(=S)(OCH$_3$)$_2$ with Cl substituent | 100 | 100 | 100 | 98 | 95 |
| ($3_1$) Cyclopropylidenemethyl-CH$_2$-P(=S)(OC$_2$H$_5$)$_2$ with Cl substituent | 100 | 98 | 95 | 90 | 80 |
| ($4_1$) Cyclopropylidenemethyl-CH$_2$-P(=S)(O-C$_6$H$_4$-SCH$_3$) with Cl substituent | 100 | 98 | 95 | 95 | 90 |

EXAMPLE 2

Plutella test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbate leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage: 100 percent means that all the caterpillars are killed, whereas 0 percent means that none of the caterpillars are killed.

The particular active compounds tested, their concentrations, the evaluation time and the results obtained can be seen from the following Table 2:

TABLE 2

Plutella test

| Active compound | Concentration of active compound in % | Degree of destruction in % after 3 days |
|---|---|---|
| | 0.1 | 100 |

($5_1$) 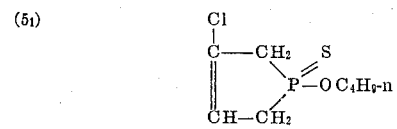

EXAMPLE 3

Drosophila test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

1 cc of the preparation of the given active compound is applied with a pipette to a filter paper disc of 7 cm diameter. The wet disc is placed in a glass vessel containing 50 vinegar flies (*Drosophila melanogaster*) and covered with a glass plate.

After the specified period of time, the destruction is determined as a percentage: 100 percent means that all the flies are killed; 0 percent means that none of the flies are killed.

The particular active compounds tested, their concentrations, the evaluation time and the degree of destruction can be seen from the following Table 3:

TABLE 3.—DROSOPHILA TEST

| Active compound | Concentration of active compound in percent | Degree of destruction in percent after 24 hours |
| --- | --- | --- |
| (2₂) Cl–C(=CH–CH₂)–CH₂–P(=S)(–OCH₃) (phospholine ring) | 0.1 | 100 |
| (3₂) Cl–C(=CH–CH₂)–CH₂–P(=S)(–OC₂H₅) (phospholine ring) | 0.1 | 100 |
| (4₂) Cl–C(=CH–CH₂)–CH₂–P(=S)(–O–C₆H₄–SCH₃) (phospholine ring) | 0.1 | 100 |

EXAMPLE 4

Tetranychus test

Solvent: 3 parts by weight acetone

Emulsifier: 1 part by weight alkylaryl polyglycol ether

To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseous vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the active compound preparation is determined by counting the dead mites. The degree of destruction thus obtained is expressed as a percentage: 100 percent means that all the spider mites are killed, whereas 0 percent means that none of the spider mites are killed.

The particular active compounds tested, their concentrations, the evaluation time and the results obtained can be seen from the following table 4:

TABLE 4

Tetranychus urticae

| Active compound | Concentation of active compound in % | Degree of destruction in % after 48 hours |
| --- | --- | --- |
| (6₁) Cl–C(=CH–CH₂)–CH₂–P(=S)(–O–C₆H₄–C(CH₃)₃) (phospholine ring) | 0.1 | 100 |

The process for preparing the active compounds according to the present invention is illustrated, without limitation, by the following further Examples

EXAMPLE 5

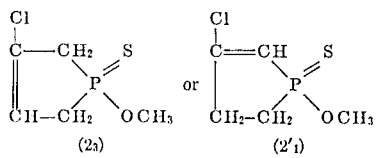

(2₁)    or    (2'₁)

62 g (0.33 mol) 1-thiono-1,3-dichoro-phospholine (b.p. 90° to 103° C/3 mm Hg) are provided in 150 ml benzene. To this mixture there are added dropwise at 10° to 15° C, with vigorous stirring, 76 ml of a methanolic solution of sodium methylate which contains 0.33 mol of sodium methylate. The reaction mixture is stirred for a further 2 hours at 40° C, and then poured into ice water. The mixture is taken up in ether, the ethereal solution is dried over sodium sulfate, and the solvent is drawn off. The residue is then distilled under reduced pressure; the corresponding 1-methoxy-1-thiono-3-chloro-phospholine isomer mixture boils at 96° to 98° C/2 mm Hg.

The yield is 50 g (83 percent of the theory)

Analysis:

Calculated for C₅H₈ClOPS (molecular weight 182.5):

|  | P | S | Cl |
| --- | --- | --- | --- |
|  | 16.99%; | 17.53%; | 19.44%; |
| Found: | 17.18% | 17.70% | 19.11%. |

The DL₅₀ of the corresponding compound in the rat per os lies about 1,000 mg/kg.

EXAMPLE 6

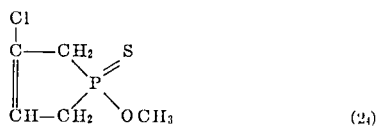

(2₁)

The mixture of isomers obtained according to Example 5 is separated at room temperature by column chromatography with silica gel, a mixture of benzene and petroleum ether in a volume ratio of 1:1 serving as flow medium. The purity of the corresponding compound thereby recovered, i.e., 1-methoxy-1-thiono-3-chloro-Δ³-phospholine, and its identity with the formula stated above with respect to the position of the double bond can be established by nuclear resonance, infrared and ultraviolet spectroscopy.

EXAMPLE 7

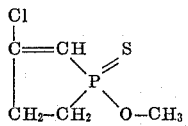
(2₂')

The compound of the above formula, i.e., 1-methoxy-1-thiono-3-chloro-Δ²-phospholine, is obtained and identified according to the method stated in Example 6 from the mixture prepared according to Example 5.

EXAMPLE 8

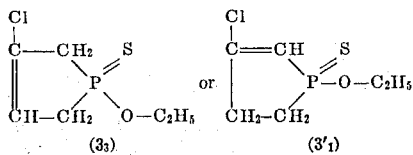
(3₃)  or  (3'₁)

To a mixture of 62 g (0.33 mol) 1-thiono-1,3-dichlorophospholine and 150 ml benzene there are added dropwise at 10° to 15° C, with vigorous stirring, 145 ml of an ethanolic solution which contains 0.33 mol sodium ethylate. The reaction mixture is subsequently stirred for a further 2 hours at room temperature and then poured into ice water. Working up of the mixture takes place as stated in Example 5.

The corresponding 1-ethoxy-1-thiono-3-chlorophospholine isomer mixture (Δ³ and Δ²) boils at 93° to 95° C/2 mm Hg (separation of the isomers is possible, as described above in Examples 6 and 7).

The yield is 52 g (79 percent of the theory)

Analysis:
Calculated for C₆H₁₀ClOPS (molecular weight 196.5):

|        | P      | S      | Cl     |
|--------|--------|--------|--------|
|        | 15.78%; | 16.28%; | 18.04%; |
| Found: | 15.72%; | 16.27%; | 17.96%. |

EXAMPLE 9

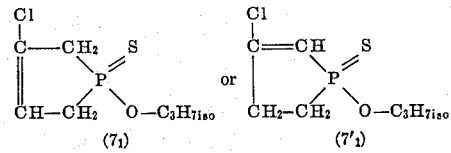
(7₁)  or  (7'₁)

50 ml isopropanol are added over a period of 10 minutes, at 40° C, to 62 g (0.33 mol) 1-thiono-1,3-dichlorophospholine; 27 g (0.33 mol) pyridine are then added dropwise to the mixture, with stirring, and the resulting mixture is heated at 40° to 50° C for a further 2 hours. Thereafter, the reaction mixture is poured into ice water, the product is extracted with carbon tetrachloride, and the extraction solution is dried over sodium sulfate. Finally, the solvent is drawn off under reduced pressure and the residue is distilled. The corresponding 1-isopropoxy-1-thiono-3-chlorophospholine isomer mixture (Δ³ and Δ²) boils at 99° to 101° C/2 mm Hg.

The yield is 50 g (72 percent of the theory)

Analysis:
Calculated for C₇H₁₂ClOPS (molecular weight 210.5):

|        | P      | S      |
|--------|--------|--------|
|        | 14.71%; | 15.20%; |
| Found: | 14.85%; | 15.05%. |

EXAMPLE 10

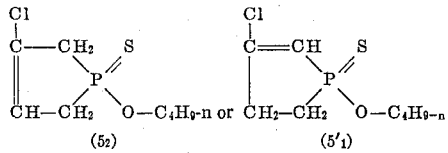
(5₂)  or  (5'₁)

The above compounds are obtained in an analogous manner to that of the preceding Example with a yield of 80 percent of the theory. The corresponding 1-n-butoxy-1-thiono-3-chloro-phospholine isomer mixture (Δ³ and Δ²) boils at 124° to 127° C under a pressure of 3 mm Hg.

EXAMPLE 11

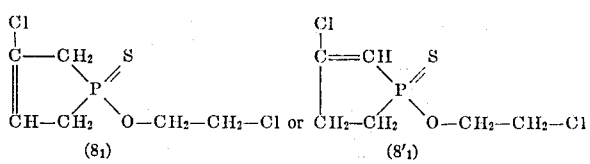
(8₁)  or  (8'₁)

Preparation is effected in a manner analogous to the procedure of Example 9. The corresponding 1-(β-chloroethoxy)-1-thiono-3-chloro-phospholine isomer mixture (Δ³ and Δ²) is obtained in 50 percent yield and boils at 133° C/3 mm Hg.

EXAMPLE 12

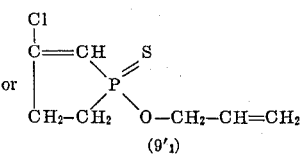
(9₁)  or  (9'₁)

In an analogous manner to that described in Example 9, the corresponding 1-allyloxy-1-thiono-3-chlorophospholine isomer mixture (Δ³ and Δ²) is obtained in a yield of 81 percent of the theory. The corresponding product boils at 101° to 103° C/2 mm Hg.

EXAMPLE 13

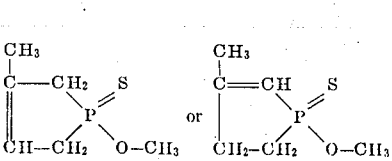
(1₂)  or  (1'₁)

The corresponding isomer product is obtained according to Example 5 from 1-thiono-1-chloro-3-methyl-phospholine (m.p. 49° to 51° C) and a solution of sodium methylate in methanol. The yield is 68 percent of the theory. The corresponding 1-methoxy-1-thiono-3-methyl-phospholine isomer mixture (Δ³ and Δ²) boils at 104° to 108° C under a pressure of 2 mm Hg.

EXAMPLE 14

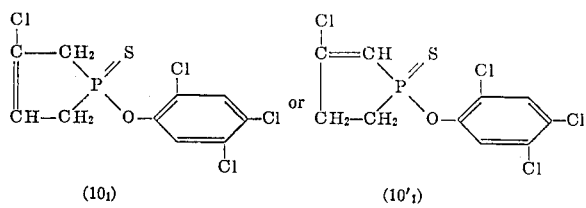

50 ml of a solution which contains 0.25 mol sodium methylate dissolved in methanol are added to a suspension of 49 g (0.25 mol) 2,4,5-trichloro-phenol (m.p. 64° to 67° C) in 250 ml benzene. Methanol and benzene are then distilled off with vigrous stirring and the residue is taken up in 250 ml methylethyl ketone. 47 g (0.25 mol) 1-thiono-1,3-dichlorophospholine are then added dropwise to the mixture at 20° C, with stirring, and heating at 45° to 50° C is carried out for a further 3 hours. The reaction mixture is then poured into cold water, the organic phase is diluted with ether and the ethereal layer is separated and dried over sodium sulfate. After the solvent has been distilled off, a reddish-brown, water-insoluble, non-distillable oil is obtained. The yield of the corresponding 1-(2',4',5'-trichlorophenyloxy)-1-thiono-3-chloro-phospholine isomer mixture ($\Delta^3$ and $\Delta^2$) is about 80 percent of the theory.

EXAMPLE 15

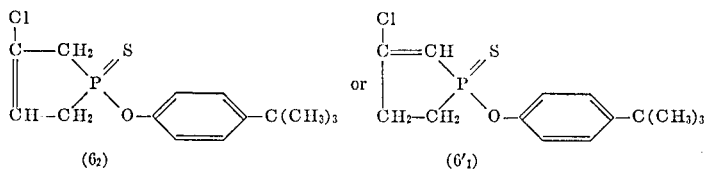

The corresponding compound is obtained in a manner analogous to Example 14 from 4-tert.-butyl-phenol (m.p. 99° C) and sodium methylate with subsequent reaction of the sodium butylphenolate obtained initially with 1-thiono-1,3-dichlorophospholine. The corresponding 1-(4'-tert.-butylphenyloxy)- 1-thiono-3-chloro-phospholine isomer mixture ($\Delta^3$ and $\Delta^2$) is a water-insoluble oil with a refractive index $n_D^{23} = 1.5627$. The yield is 95 percent of the theory.

EXAMPLE 16

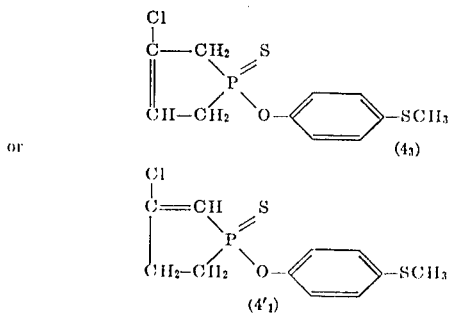

Preparation is effected in the manner described in Example 15 above, starting from 4-methylmercapto-phenol and sodium methylate followed by reaction of the sodium salt formed with 1-thiono-1,3-dichloro-phospholine. The corresponding 1-(4'-methylmercap-to-phenyloxy)-1-thiono-3-chlorophospholine isomer mixture ($\Delta^3$ and $\Delta^2$) is a water-insoluble, non-distillable oil.

The yield is 90 percent of the theory.

It will be realized by the skilled artisan that each of the corresponding isomers in the foregoing production examples can be isolated from the isomer mixture in a suitable manner such as that described in Examples 6 and 7 above, and that each said isomer possesses the corresponding physical properties noted in said production examples as well as the corresponding pesticidal activity in question.

More specifically, it will be realized that all of the foregoing compounds contemplated by the present invention possess the desired selective pesticidal, especially nematocidal, arthropodicidal, i.e., insecticidal or acaricidal, and fungicidal properties for combating nematodes, insects and acarids, as well as fungi, and that such compounds have not only a very slight toxicity toward warm-blooded creatures, but also a concomitantly low phytotoxicity.

As may be used herein, the terms "arthropod," "arthropodicidal and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicadally effective amount which in effect means an insecticidally or acaricidally effective amount of the active compound for the desired purposes.

It will be appreciated that the instant specification and examples are set forth by way of illustration and not limitation, and thatvarious modifications and changes may be made without departing from the spirit and scope of the present invention.

What is claimed is:

1. A pesticidal composition wherein the pests are selected from the group consisting of insects, acarids, nematodes and fungi comprising a pesticidally effective amount of a compound of the formula

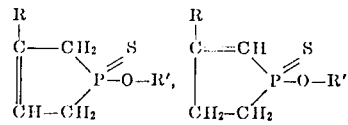

or mixtures thereof,
wherein
R is selected from the group consisting of chloro and alkyl of one to four carbon atoms, and R' is selected from the group consisting of alkyl of one to six carbon atoms, alkenyl of two to four carbon atoms, chloroalkyl of one to four carbon atoms, alkylphenyl having one to four carbon atoms in the alkyl moiety, alkylmercaptophenyl having one to four carbon atoms in the alkylmercapto moiety, and chloro-substituted phenyl, in admixture with a solid or liquid diluent or carrier.

2. A composition according to claim 1 wherein said compound is:

1-methoxy-1-thiono-3-methyl- $\Delta^3$-phospholine,
1-methoxy-1-thiono-3-chloro-$\Delta^2$-phospholine,
1-methoxy-1-thiono-3-chloro-$\Delta^3$-phospholine,
1-(4'-methylmercapto-phenoxy)-1-thiono-3-chloro-$\Delta^3$-phospholine,
1-(4'-tert.-butyl-phenoxy)-1-thiono-3-chloro-$\Delta^3$-phospholine,
1-($\beta$-chloro-ethoxy)-1-thiono-3-chloro-$\Delta^3$-phospholine, or
1-(2',4',5'-trichloro-phenoxy)-1-thiono-3-chloro-$\Delta^3$-phospholine.

3. The method of combatting a pest selected from the group consisting of an insect, acarid, nematode and fungus which comprises applying to such pest or its habitat a pesticidally effective amount of a compound of the formula

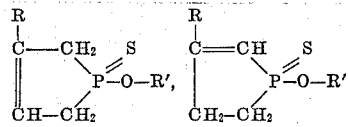

of mixtures thereof,
wherein
R is selected from the group consisting of chloro and alkyl of one to four carbon atoms, and R' is selected from the group consisting of alkyl of one to six carbon atoms, alkenyl of two to four carbon atoms, chloroalkyl of one to four carbon atoms, alkylphenyl having one to four carbon atoms in the alkyl moiety, alkylmercaptophenyl having one to four carbon atoms in the alkylmercapto moiety, and chloro-subsituted phenyl.

4. The method according to claim 3 wherein
R is selected from the group consisting of chloro and $C_{1-4}$ alkyl, and
R' is selected from the group consisting of $C_{1-4}$ alkyl, $C_3$ alkenyl, chloro-$C_{1-3}$ alkyl, $C_{1-4}$ alkylphenyl, $C_{1-4}$ alkylmercaptophenyl, and mono to tri chloro-phenyl.

5. The method according to claim 3 wherein R is selected from the group consisting of chloro, and $C_{1-2}$ alkyl, and
R' is selected from the group consisting of $C_{1-4}$ alkyl, $C_{1-4}$ alkylphenyl, and $C_{1-4}$ alkylmercaptophenyl.

6. The method according to claim 3 wherein such compound is 1-methoxy-1-thiono-3-methyl-$\Delta^3$-phospholine of the formula

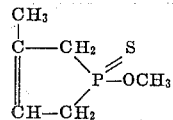

7. The method according to claim 3 wherein such compound is 1-methoxy-1-thiono-3-chloro-$\Delta^2$-phospholine of the formula

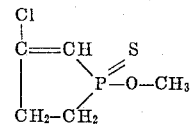

8. The method according to claim 3 wherein such compound is 1-methoxy-1-thiono-3-chloro-$\Delta^3$phospholine of the formula

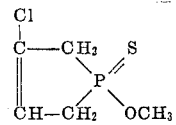

9. The method according to claim 3 wherein such compound is 1-(4'-methylmercapto-phenoxy)-1-thiono-3-chloro-$\Delta^3$-phospholine of the formula

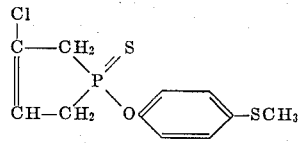

10. The method according to claim 3 wherein such compound is 1-(4'-tert.-butyl-phenoxy)-1-thiono-3-chloro-$\Delta^3$-phospholine of the formula

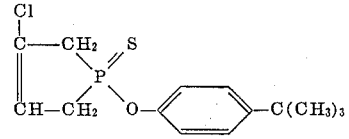

11. The method according to claim 3 wherein such compound is 1-($\Delta$-chloro-ethoxy)-1-thiono-3- chloro-$\Delta^3$-phospholine of the formula

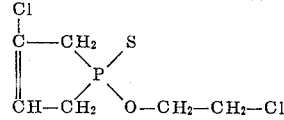

12. The method according to claim 3 wherein such compound is 1-(2', 4', 5'-trichloro-phenoxy)-1-thiono-3-chloro-$\Delta^3$-phospholine of the formula

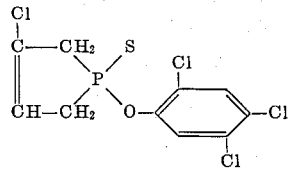

* * * * *